United States Patent
Guerin et al.

(10) Patent No.: US 11,097,415 B2
(45) Date of Patent: *Aug. 24, 2021

(54) GENERATION OF ROBOTIC USER INTERFACE RESPONSIVE TO CONNECTION OF PERIPHERALS TO ROBOT

(71) Applicant: THE JOHNS HOPKINS UNIVERSITY, Baltimore, MD (US)

(72) Inventors: Kelleher Guerin, Baltimore, MD (US); Gregory Hager, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/520,873

(22) Filed: Jul. 24, 2019

(65) Prior Publication Data
US 2019/0344438 A1    Nov. 14, 2019

Related U.S. Application Data

(63) Continuation of application No. 15/342,053, filed on Nov. 2, 2016, now Pat. No. 10,399,220.
(Continued)

(51) Int. Cl.
*B25J 9/16* (2006.01)
*G05B 19/409* (2006.01)

(52) U.S. Cl.
CPC ............ *B25J 9/161* (2013.01); *B25J 9/1671* (2013.01); *G05B 19/409* (2013.01); *G05B 2219/40095* (2013.01); *G05B 2219/40099* (2013.01)

(58) Field of Classification Search
CPC ...... B25J 9/161; B25J 9/1671; B25J 15/0483; B25J 9/08; B25J 15/0491; G05B 19/409;
(Continued)

(56) References Cited

U.S. PATENT DOCUMENTS 6,366,293 B1 * 4/2002 Hamilton ............... B25J 9/1671
                                            345/420
8,525,853 B1 * 9/2013 Hickman ............... G06T 19/00
                                            345/630
(Continued)

FOREIGN PATENT DOCUMENTS

WO    2005059666 A1    6/2005
WO    2006117022 A1    11/2006

OTHER PUBLICATIONS

Extended European Search Report dated Mar. 26, 2019 in corresponding EP Application No. 16862910.3, 10 pages.
(Continued)

*Primary Examiner* — Dale Moyer
(74) *Attorney, Agent, or Firm* — MH2 Technology Law Group LLP

(57) ABSTRACT

Methods and systems for connection-driven generation of robotic user interfaces and modification of robotic properties include detecting a connection of a robotic peripheral to a robot; obtaining a peripheral property set corresponding to the robotic peripheral, wherein the peripheral property set includes one or more properties of the robotic peripheral; modifying, based on the peripheral property set, a robotic property set that includes one or more properties of the robot to provide a modified robotic property set; generating, during runtime, a robotic graphical user interface ("RGUI") dynamically based on the peripheral property set, wherein the RGUI provides at least one user-accessible interface to control the robot and the robotic peripheral; and controlling, based on the modified robotic property set, the robot and the robotic peripheral in response to user input received via the RGUI.

17 Claims, 7 Drawing Sheets

Related U.S. Application Data

(60) Provisional application No. 62/249,858, filed on Nov. 2, 2015.

(58) Field of Classification Search
CPC .......... G05B 2219/40095; G05B 2219/40099; G05B 2219/39468; G05B 2219/49304; G05B 2219/50338
See application file for complete search history.

(56) References Cited

U.S. PATENT DOCUMENTS

| | | | |
|---|---|---|---|
| 9,272,418 B1 | 3/2016 | Guerin et al. | |
| 10,399,220 B2 | 9/2019 | Guerin et al. | |
| 2005/0071804 A1* | 3/2005 | Miserocchi | G06T 17/00 717/104 |
| 2007/0276538 A1 | 11/2007 | Kjellsson et al. | |
| 2011/0071676 A1 | 3/2011 | Sanders et al. | |
| 2013/0060378 A1 | 3/2013 | Schmitz et al. | |
| 2014/0149963 A1 | 5/2014 | Jang et al. | |
| 2014/0350722 A1 | 11/2014 | Skrinde | |
| 2014/0350723 A1 | 11/2014 | Prieto et al. | |
| 2015/0100066 A1 | 4/2015 | Kostrzewski et al. | |
| 2015/0277430 A1* | 10/2015 | Linnell | G05B 19/42 700/257 |
| 2017/0057085 A1* | 3/2017 | Cookson | B25J 15/0066 |
| 2017/0123820 A1 | 5/2017 | Nishi et al. | |
| 2018/0004187 A1* | 1/2018 | Linnell | G05B 19/42 |
| 2018/0154521 A1 | 6/2018 | Bosscher et al. | |

OTHER PUBLICATIONS

Guerin et al., "Adjutant: A Framework for Flexible Human-Machine Collaborative Systems", 2014 IEEE/RSJ International Conference on Intelligent Robots and Systems (IROS 2014), Sep. 14-18, 2014.

* cited by examiner

GENERATION OF ROBOTIC USER INTERFACE RESPONSIVE TO CONNECTION OF PERIPHERALS TO ROBOT

CLAIM OF PRIORITY

This application is a continuation of U.S. patent application Ser. No. 15/342,053 filed on Nov. 2, 2016, which claims priority to U.S. Provisional Patent Application 62/249,858 filed on Nov. 2, 2015, the disclosures of which are hereby incorporated by reference in their entireties.

GOVERNMENT SUPPORT STATEMENT

This invention was made with Government support under Grant No. NRI-1227277 awarded by the National Science Foundation. The U.S. Government has certain rights in this invention.

FIELD

The present disclosure relates generally to systems and methods that dynamically generate and adapt robotic user interfaces, with which users can interact with and program at least one robot, based on a robotic configuration of the robot and changes in the robotic configuration.

BACKGROUND

Robotic industrial automation has seen significant success in large-scale manufacturing because it offers significant advantages at scale for tasks such as welding, cutting, stamping, painting, heavy material handling, precision material machining, etc. The success of robotic automation in large-scale manufacturing has led to a long-standing desire to extend the use of robotic automation into small and medium-sized manufacturing enterprises ("SMEs"). However, in contrast to large scale manufacturing, SMEs' production processes are typically characterized by small production volumes and/or high product variability. Consequently, the ability to amortize the infrastructure, specialized personnel, setup, and programming of flexible robotic automation is far reduced for SMEs.

SME processes sometimes include tasks that require a high level of customization and therefore necessarily involve human skill and judgment. For example, refurbishment tasks and build-to-order manufacturing processes must accommodate unforeseen workpiece variances and equipment modifications. In such cases, an existing human-centered production process may find it difficult to determine where or how robotic automation can be a useful addition to an effective human-intensive process, rather than a duplication or attenuation thereof. Take, for instance, an SME specializing in custom furniture manufacturing that has a number of highly-skilled employees. That SME may want to improve the efficiency and productivity of its employees by using robotic systems to automate repetitive tasks that involve dexterous actions, such as drilling or sanding tasks. However, a commercial off-the-shelf robotic system would not be useful in this case because it would be impossible for the SME to leverage its employees' existing task knowledge and experience.

User experience associated with expanding capability of robotic systems can also be problematic during robotic system integration. When a robot is being equipped or outfitted with additional devices (e.g., sensors, cameras, grippers, etc.) or end effector tooling, there is a requirement that programming effort must be made for these devices or tooling to be utilized by the end user. For example, an out-of-the-box robotic system may include a programming language interface ("PLI") for moving the arm around in Cartesian space. If a gripper is attached to the robot to give it the ability to grasp objects, a user (e.g., an integrator) must install firmware for this gripper, which then exposes some set of programmatic entities to the PLI. Now consider the example where the same robotic system incorporates a graphical user interface ("GUI") for programming. The gripper is attached and firmware must be installed to provide the appropriate GUI entities so that the user can access the robotic system's functionality. For most state of the art systems, this seamless integration of an appropriate GUI for attached tooling is not possible. Generally, if this type of functionality is desired, the system is built from the ground up with the GUI for the tooling, without any accommodation for expandability.

Therefore, there is a need for systems and methods for overcoming these and other problems presented by the prior art.

SUMMARY

There is increasing interest in more flexible robotic systems and platforms, particularly for SMEs. This includes robots that may have easy-to-install or hot-swappable robotic peripherals, such as sensors, end effectors, tooling, and other peripherals. There is also an increased interest in the ease-of-use of these systems for novice end-users. As GUI-based systems for programming robots become more widespread, there are emergent needs for automatic generation of dynamic GUI elements and modification of robotic properties responsive to on-line integration of hot-swappable hardware or robotic peripheral.

Various embodiments of the present disclosure include examples of a GUI-based robotic programming platform that obtains a robotic configuration of one or more robots, detects changes in the robotic configuration, and adaptively generates robotic GUIs ("RGUIs") and updates robotic properties of the robots based on the robotic configuration and the changes in the robotic configuration. The RGUIs provide interfaces for users to interact with or program the robots and/or one or more robotic modules connected to the robots.

Embodiments of the present disclosure relate to systems and methods for performing connection-driven modification of robots' properties and generation of RGUIs for the robots in response to robotic peripherals being connected to or disconnected from the robots. Specifically, a computer-implemented method for connection-driven generation of RGUIs and modification of robotic properties includes detecting a connection of a robotic peripheral to a robot; obtaining a peripheral property set corresponding to the robotic peripheral, wherein the peripheral property set includes one or more properties of the robotic peripheral; modifying, based on the peripheral property set, a robotic property set that includes one or more properties of the robot to provide a modified robotic property set; generating, during runtime, a RGUI dynamically based on the peripheral property set, wherein the RGUI provides at least one user-accessible interface to control the robot and the robotic peripheral; and controlling, based on the modified robotic property set, the robot and the robotic peripheral in response to user input received via the RGUI.

The GUI-based robotic programming platform examples provide capabilities for seamless on-line swapping of robotic hardware and software modules on robotic systems, with minimal to no requirement for integrating drivers that operate such robotic modules or GUI elements that allow users to interact with and control such robotic modules. Additional objects and advantages of the embodiments of the disclosure will be set forth in part in the description which follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

DETAILED DESCRIPTION

Figure 1:
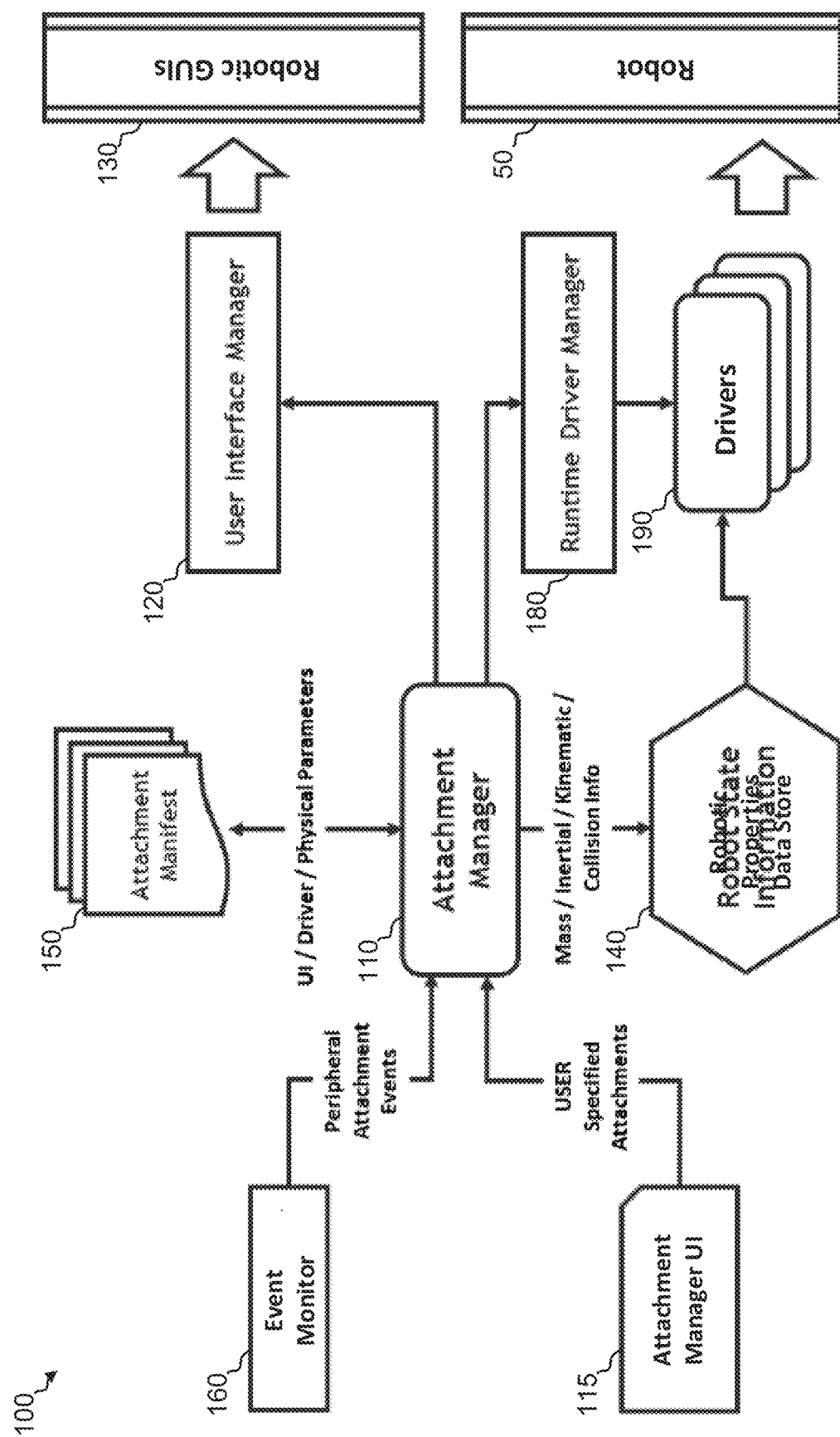
FIG. 1 illustrates an embodiment of a robotic programming platform that dynamically generates and adapts RGUIs for one or more robots based on the robots' configuration and changes therein, consistent with the principles of the present disclosure.

Reference will now be made in detail to example embodiments, which are illustrated in the accompanying drawings. When appropriate, the same reference numbers are used throughout the drawings to refer to the same or like parts.

For simplicity and illustrative purposes, the principles of the present disclosure are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary embodiments. Electrical, mechanical, logical and structural changes may be made to the exemplary embodiments without departing from the spirit and scope of the present disclosure. The following detailed description is, therefore, not to be taken in a limiting sense and the scope of the present disclosure is defined by the appended claims and their equivalents.

In the present disclosure, the word "robot" will be used instead of robotic manipulator or robotic system. Typically, a robot is an industrial robotic manipulator or a set of industrial robotic manipulators for automated or semi-automated production applications. A robot's end effector can be a tool effector attached to the robot at a connection site or a tool grasped or held by a gripper-type end effector attached to the robot. The following general definitions will be used herein. Robotic hardware module: a physical device or tooling that can be connected (e.g., attached, coupled, linked, etc.) to a robot and/or disconnected (e.g., detached, decoupled, delinked, and the like) from the robot. Peripheral or robotic peripheral: a robotic hardware module that can be connected to a robot to provide some physical interaction, manipulation, and/or sensing capability. Active peripheral: a peripheral that can communicate with a robot via one or more communication channels such as a network connection, a Universal Serial Bus ("USB") connection, etc., and may or may not have a physical connection with the robot. Passive peripheral: a peripheral with only a mechanical connection to a robot. Software module: a unit of software that encapsulates some processing, algorithmic, or inference capability accessible via at least one defined interface. Software component: an instantiated software module. User interface ("UI"): a visual, gestural, haptic, or audio interface that allows for user interaction with a robot. Robotic graphical UI ("RGUI"): at least one UI that allows a user to program or interact with a robot using graphical widgets on a supported device. UI component: a widget or graphical element that can accept input and events from a user and provide information to the user.

Various embodiments of the present disclosure include systems and methods for adaptively generating RGUIs and updating robotic properties based on a robotic configuration and changes in the robotic configuration. An exemplary robotic programming platform obtains a robotic configuration of one or more robots, generates RGUIs for the robots adaptively based on the robots' robotic configuration, detects changes in the robots' robotic configuration, and adapts the RGUIs for the robots dynamically in response to the detected changes in the robotic configuration. The robotic programming platform utilizes event monitors, user input, and/or sensors to detect changes in the robots' robotic configuration, which can result from, for example, robotic hardware modules being connected to or disconnected from the robots, robotic software modules being enabled or disabled, a subset of robotic hardware modules connected to the robots or robotic software modules enabled for the robots being selected or deselected, or the like.

The robotic programming platform dynamically adds or adapts GUI elements to adaptively generate one or more RGUIs for at least one user to interact with or program the robots and/or one or more robotic modules connected to the robots. The robotic programming platform can (1) dynamically add or adapt appropriate GUI elements for the RGUIs in response to robotic hardware modules being physically connected to the robots; (2) dynamically add or adapt appropriate GUI elements in RGUIs in response to add-on robotic software modules being enabled; (3) dynamically load GUI elements in RGUIs in response to a subset of connected robotic hardware modules or enabled robotic software modules being selected; (4) add or adapt, in real-time, GUI elements in RGUIs in response to system-sensed changes in the physical configuration of the robots or connected robotic hardware modules, and (5) adapt, in real-time, GUI elements in RGUIs based on user-indicated changes to the physical configuration of the robots or connected robotic hardware modules.

The robotic programming platform can also dynamically update robotic properties of the robots in response to the detected changes in the robotic configuration. The robotic programming platform provides capabilities for seamless on-line swapping of robotic modules on the robots, with minimal to no requirement for the user to integrate drivers that operate such robotic modules and/or GUI elements that allow the user to interact with and control such robotic modules. By factoring in the robotic configuration, the changes in the robotic configuration, and/or the robotic properties of the robots, the robotic programming platform can adaptively customize the RGUIs to manage the user's interactions with the robots and/or the connected robotic modules. For example, the robotic programming platform can adaptively generate RGUIs that grant the user with access to all, some, or none of functionalities of the robots and/or the connected robotic modules.

Examples of the robotic programming platform provide (1) the ability to connect robotic hardware modules to one or more robots, which enables the automatic loading of drivers and UI components, as well as the updating of the robots' physical properties; (2) the ability to connect robotic software modules to the robots, which enables the automatic loading of drivers and UI components; and (3) the ability to connect robotic hardware modules to the robots via non-physical connections (e.g., network or wired connections, fluid couplings, etc.) in such a way that the robots can operate through various means (e.g., electrically, pneumatically, hydraulically) or communicate with the robotic hardware modules, which enables the automatic loading of drivers and UI components specific to the robotic hardware modules.

FIG. 1 illustrates an exemplary embodiment of a robotic programming platform that dynamically generates and adapts UIs for at least one robot 50 based on a configuration of robot 50 and changes in the configuration of robot 50, consistent with the principles of the present disclosure. In various embodiments, an example of which is shown in FIG. 1, a platform 100 includes an attachment manager 110, which is a software component loaded at runtime. Attachment manager 110 provides an integral attachment manager UI ("MUI") 115, which a user can utilize to configure, program, or interact with robot 50 and/or one or more robotic modules connected to robot 50. Platform 100 includes a UI manager 120, which is communicatively coupled to attachment manager 110 and can be invoked to dynamically generate and adapt one or more RGUIs 130 based on the robotic configuration of robot 50 and changes in the robotic configuration of robot 50.

Platform 100 includes a robotic properties data store 140 that specifies one or more robotic properties of robot 50, examples of which include mass-related information, inertia-related information, dynamics-related information, collision-related information, control gains-related information, simulation-related information, logical state-related information, kinematics-related information, connection site-related information, one or more images representative of robot 50, and the like. Robotic properties data store 140 is accessible to attachment manager 110 and can be stored locally therein. Attachment manager 110 can obtain the robotic properties of robot 50 from robotic properties data store 140, utilize the robotic properties to derive the robotic configuration of robot 50, and use attachment MUI 115 to display the robotic configuration of robot 50. For example, attachment manager 110 can obtain an image representative of robot 50 and information related to one or more connection sites of robot 50, modify the image to indicate the connection sites' relative locations on robot 50, and use attachment MUI 115 to display the modified image of robot 50 that visually indicates the relative locations of the connection sites of robot 50.

Platform 100 includes an attachment manifest 150 that specifies attachment parameters and properties related to all authorized robotic peripherals capable of being connected to robot 50. Attachment manifest 150 catalogs one or more attachment parameters and properties related to each robotic peripheral, examples of which include physical parameters and properties (e.g., the robotic hardware module's name or identifier, model, type, relative mounting offset, size, mass, connection sites, etc.), UI component requirements, driver requirements, one or more representative images, and the like. Attachment manifest 150 is accessible to attachment manager 110 and can be stored locally therein. Attachment manager 110 can look up and locate attachment perimeters and properties related to a robotic peripheral based on the robotic peripheral's identifier, and if the robotic peripheral's identifier cannot be located in attachment manifest 150, attachment manager 150 can reject the robotic peripheral as unauthorized and prevent the unauthorized robotic peripheral from being connected to robot 50.

Attachment manager 110 detects changes in the robotic configuration of robot 50 by discovering or detecting one or more attachment events related to robot 50, determining that the attachment events change the robotic configuration of robot 50, and identifying how the attachment events change the robotic configuration of robot 50. Platform 100 includes at least one event monitor 160, attachment MUI 115, and/or sensors (not shown) in platform 100 or robot 50, which attachment manager 110 can utilize to discover or detect attachment events such as robotic peripherals being connected to robot 50 or disconnected from robot 50, robotic software modules being enabled or disabled for robot 50, a subset of robotic peripherals connected to robot 50 or robotic software modules enabled for robot 50 being selected or deselected, and the like. Event monitor 160 monitors robot 50 and/or other applicable event sources in platform 100 to discover or detect peripheral attachment events triggered by active peripherals being connected to robot 50 or disconnected from robot 50. For instance, event monitor 160 can monitor one or more communication channels (e.g., network or USB connections, etc.) for peripheral attachment events. In response to the user connecting an active peripheral to robot 50, at least one of the communication channels dispatches a peripheral attachment event, which can include information related to the active peripheral, such as the active peripheral's peripheral identifier. Event monitor 160 can receive and forward the peripheral attachment event to attachment manager 110, which can process the peripheral attachment event to detect changes in the robotic configuration of robot 50 resulting from the attachment of the active peripheral to robot 50. Attachment manager 110 can identify the active peripheral and/or obtain information related to the active peripheral, for example, by processing the peripheral attachment event, polling robot 50 and/or the active peripheral, querying attachment manifest 150 and/or the user via attachment MUI 115, or the like.

When the user connects a passive peripheral to robot 50 or disconnects a passive peripheral from robot 50, the user can utilize attachment MUI 115 to identify the passive peripheral and specify that the passive peripheral has been connected to robot 50 or disconnected from robot 50. To identify the passive peripheral, the user can use attachment MUI 115 to input or select a peripheral identifier corresponding to the passive peripheral. In response, attachment MUI 115 dispatches a user-specified attachment event to attachment manager 110, which can process the user-specified attachment event to detect changes in the robotic configuration of robot 50 resulting from the attachment or detachment of the passive peripheral to robot 50. Attachment manager 110 can identify the passive peripheral and/or obtain information related to the passive peripheral, for example, by processing the user-specified attachment event, polling robot 50, querying attachment manifest 150 and/or the user via attachment MUI 115, or the like. Similarly, when the user enables or disables robotic software modules for robot 50, select or deselect a subset of robotic peripherals connected to robot 50 or robotic software modules enabled for robot 50, etc., attachment MUI 115 can dispatch one or more user-specified attachment events to attachment manager 110, which can process the user-specified attachment events to detect changes in the robotic configuration of robot 50.

The user can use attachment MUI 115 to view and specify the physical configuration of the robotic peripheral relative to robot 50, including whether or not the robotic peripheral is physically connected to robot 50, and if physically connected, then at which connection site of robot 50, or if not physically connected, whether or not the robotic peripheral is connected to robot 50 via a non-physical connection (e.g., network or wired connections, fluid couplings, etc.). Attachment MUI 115 includes a drag-and-drop interface for specifying which robotic peripherals are attached to robot 50 and where, and can display one or more robotic properties of robot 50. For example, attachment manager 110 can display one or more connection sites of robot 50 capable of accepting the robotic peripheral. Attachment manager 110 tracks a set of currently-connected robotic peripherals that are connected to robot 50 and denote the set as the loadout of robot 50.

When the user utilizes attachment MUI 115 to drag a peripheral icon representative of the robotic peripheral to a robot icon representative of robot 50, attachment MUI 115 can highlight any of the connection sites of robot 50 that can mechanically accept the robotic peripheral, as defined by attachment manifest 150. The specification on how this attachment takes place, including the relative mounting offsets of the different components is captured in attachment manifest 150. This creates a seamless experience for the user where they do not have to specify offsets directly. The robotic peripherals, assuming their manifest in attachment manifest 150 contains the appropriate attachment information, will "snap" to the proper location on the robot.

TABLE 1

An Example Configuration File

| Property Type | Property Value |
|---|---|
| name: | Ready Adaptive Gripper |
| model: | RG-A |
| info: | Robotiq Type 85 2-Finger Gripper |
| mesh: | ready_adaptive_gripper.STL |
| image: | ready_adaptive_gripper.png |
| urdf: | ready_adaptive_gripper.urdf.xacro |
| macro_name: | ready_adaptive_gripper |
| attachment_link: | ready_adaptive_base_link |
| offset_xyz: | [0, 0, 0] |
| offset_rpy: | [1.5707, 0, 1.5707] |
| type: | adaptive_gripper |
| driver: | [robotiq_c_model_control, CModelTeleop.launch] |
| ui: | [ready_adaptive_gripper_open, ready_adaptive_gripper_close] |

When a loadout has been defined, the user can trigger attachment manager 110 to regenerate, which includes several actions: (a) attachment manager 110 looks through attachment manifest 150 for at least one connected robotic peripheral and match any that have been specified in the loadout; (b) attachment manager 110 updates the current robotic properties file with the mass, inertial or dynamic information, collision properties or other properties of the connected robotic peripheral; (c) attachment manager 110 loads drivers required by the connected robotic peripheral as specified in attachment manifest 150; and (d) attachment manager 110 communicates with any UI components in platform 100 or RGUIs 130, and load the required UIs for the connected robotic peripheral. Attachment manager 110 can utilize a runtime driver manager 180 to search drivers 190 for drivers required by the connected robotic peripheral and load the required drivers, as well as unload a loaded robotic peripheral driver. Attachment manager 110 can utilize user interface manager 120 to load or unload UI components and RGUIs 130 required or specified by the connected robotic peripheral.

Figure 2:
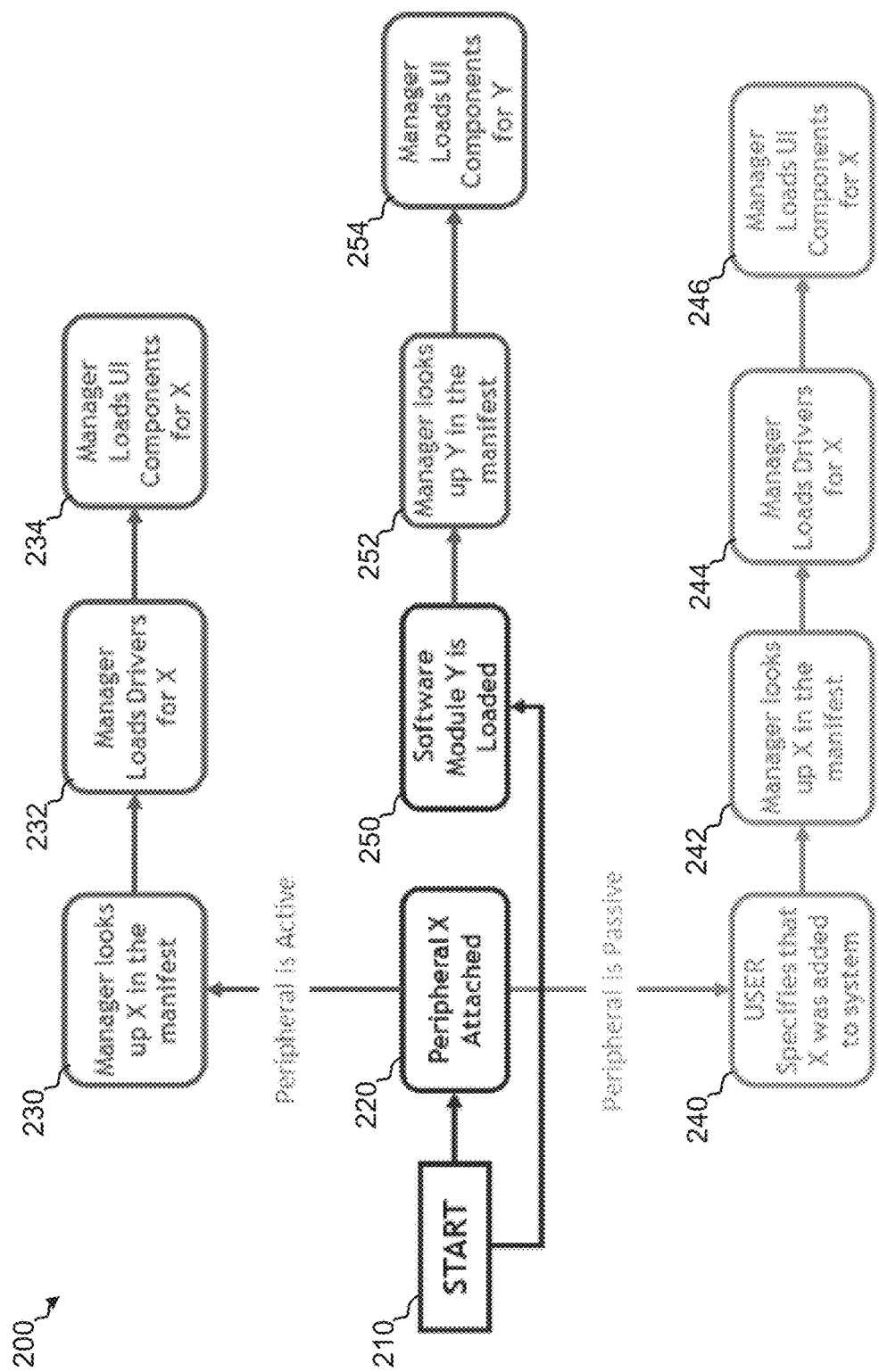
FIG. 2 is a flow diagram illustrating an example of a method for dynamically generating and adapting RGUIs for one or more robots based on the robots' configuration and changes therein, consistent with embodiments of the present disclosure.

FIG. 2 illustrates an example process for dynamically generating and adapting RGUIs for one or more robots based on the robots' configuration and changes therein, consistent with embodiments of the present disclosure. Process 200 is performed in platform 100. More particularly, attachment manager 110 in platform 100 performs process 200 to detect changes in a robotic configuration of robot 50 and dynamically generate and adapt RGUIs for robot 50. Process 200 starts at stage 210, at which attachment manager 110 obtains robotic properties and a robotic configuration of robot 50. Attachment manager 110 defines a loadout of robot 50 based on the robotic properties and/or configuration of robot 50 and/or any robotic peripherals connected to robot 50. Attachment manager 110 can generate a visual representation of robot 50 and/or any connected robotic peripherals based on the loadout and display the visual representation via attachment MUI 115. For example, attachment MUI 115 can display the visual representation of robot 50 that highlights one or more connection sites of robot 50.

At stage 210, attachment manager 110 monitors robot 50 and/or platform 100 to discover or detect attachment events related to robot 50. More particularly, attachment manager 110 can detect or discover robotic peripherals being connected to or disconnected from robot 50, robotic software modules being enabled or disabled for robot 50, a subset of connected robotic peripherals or enabled robotic software modules being selected or deselected, and the like. In response to discovering or detecting at least one attachment event related to robot 50, attachment manager 110 identifies how the attachment event changes the robotic configuration of robot 50, by classifying the attachment event as either peripheral-related or not peripheral-related and then modifying the robotic configuration of robot 50 accordingly. If the attachment event is classified at stage 200 as peripheral-related, i.e., caused by a peripheral being connected to robot 50, then process 200 proceeds to stage 220.

At stage 220, attachment manager 110 classifies the peripheral as an active peripheral or a passive peripheral. If at stage 220 the peripheral is classified as active, then process 200 proceeds to stage 230, at which attachment manager 110 obtains or polls the active peripheral and/or robot 50 for information related to the active peripheral and/or the attachment event. Attachment manager 110 then uses the peripheral-related information to look up the active peripheral's manifest in attachment manifest 150 for parameters and properties related to the active peripheral. Attachment manager 110 can modify or update the robotic configuration of robot 50 based on the active peripheral's parameters and properties, and then use attachment manager 110 to regenerate the visual representation of robot 50 based on the updated robotic configuration. Next, at stage 232, attachment manager 110 loads drivers required by the active peripheral's manifest. Then, at stage 234, attachment manager 110 loads UI components required by the active peripheral's manifest to dynamically generate and adapt RGUIs for robot 50 and the active peripheral. Subsequent to stage 234, process 200 returns to stage 210.

Alternatively, if at stage 220 the peripheral is classified as passive, then process 200 proceeds to stage 240, at which attachment manager 110 obtains, via attachment manager UI 115, user-specified information related to the passive peripheral and/or the attachment event. At stage 242, attachment manager 110 then uses the user-specified information to look up the passive peripheral's manifest in attachment manifest 150 for parameters and properties related to the passive peripheral. Attachment manager 110 can customize the visual representation of robot 50 based on the passive peripheral's parameters and properties and display the customized visual representation via attachment MUI 115. For example, attachment MUI 115 can customize the visual representation of robot 50 to indicate which, if any, of the connection sites of robot 50 is compatible with the passive peripheral, e.g., can accept the passive peripheral. Attachment manager 110 can receive user input via attachment MUI 115 to select a compatible connection site for the passive peripheral, and modify or update the robotic configuration of robot 50 based on the selected connection site and passive peripheral's parameters and properties. Attachment MUI 115 can then regenerate the visual representation of robot 50 based on the updated robotic configuration. Next, at stage 244, attachment manager 110 loads drivers required by the passive peripheral's manifest. Then, at stage 246, attachment manager 110 loads UI components required by the passive peripheral's manifest to dynamically generate and adapt RGUIs for robot 50 and the passive peripheral. Subsequent to stage 246, process 200 returns to stage 210.

If at stage 210 the attachment event is classified as not peripheral-related, then process 200 proceeds to stage 250. At stage 250, attachment manager 110 loads at least one robotic software modules and then proceeds to stages 252 and 254, in which attachment manager 110 dynamically generates and adapts RGUIs for robot 50 by looking up the robotic software module's manifest in attachment manifest 150, loading drivers required by the robotic software module's manifest, and loading UI components required by the robotic software module's manifest. Subsequent to stage 254, process 200 returns to stage 210.

Figure 3:
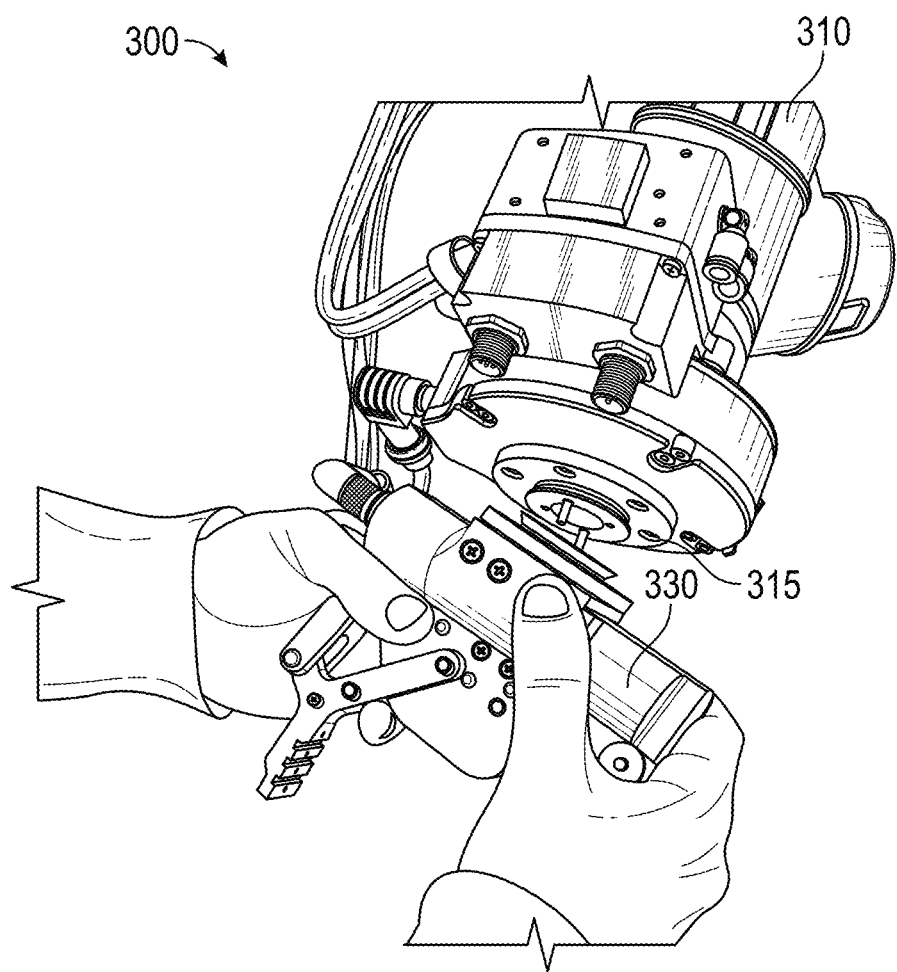
FIGS. 3, 4A, 4B, and 5 illustrate an example scenario in which the robotic programming platform dynamically generates and adapts RGUIs for a robot based on the robot's configuration and changes therein, consistent with the principles of the present disclosure.

FIG. 3 shows an example scenario 300, where a robot 310 has at least one end effector 315 through which robot 310 can connect to and control at least one robotic peripheral 330. End effector 315 serves as a connection site of robot 310. As shown in FIG. 3, at least one user can attach robotic peripheral 330 to end effector 315 to physically and/or electrically connect robotic peripheral 330 to robot 310. In example scenario 300, end effector 315 of robot 310 starts with no robotic peripherals. The user attaches ADAPTIVE GRIPPER (an active peripheral) to end effector 315. The user then uses attachment MUI 115 to specify that the gripper has been attached to end effector 315 of robot 310 with COLLAR_A (a passive peripheral), by first dragging a graphical representation of COLLAR_A to the end effector location on a graphical representation of robot 310, then dragging the graphical representation of ADAPTIVE GRIPPER to the end effector location. When the user drags COLLAR_A to the end of effector location of the graphical representation of robot 310, attachment MUI 115 checks that end effector 315 is a properly defined attachment location for the COLLAR_A, and if so, the graphical representation of COLLAR_A will "snap" to the end effector location of the graphical representation of robot 310 at the pre-specified offsets contained in attachment manifest of COLLAR_A. The user then selects a "generate" button, and attachment manager 110 first updates the physical properties of robot 310 based on the new mass, inertial characteristics and collision parameters of COLLAR_A and ADAPTIVE GRIPPER. For instance, since the gripper and collar are connected to end effector 315, robot 310 now has more weight on it, and therefore attachment manager 110 can apply an offset to the gravity compensation or force sensing components. Additionally, the end of robot 310 now protrudes further, so the collision information is updated as well. Attachment manager 110 then loads the driver for ADAPTIVE GRIPPER, as the only active peripheral connected. Attachment manager 110 then looks to the attachment manifest for ADAPTIVE GRIPPER, and finds two user interface components ("UICs") that must be loaded. Attachment manager 110 then makes these two UICs available to the rest of platform 100, and any running RGUIs that accept components of that type will automatically load the UICs. This will display to the user as two new buttons for controlling the ADAPTIVE GRIPPER in whichever user interface they are using. When the user changes out ADAPTIVE GRIPPER for another gripper PRECISION GRIPPER, attachment manager 110 unloads any running drivers and UICs for ADAPTIVE GRIPPER, and then loads the required drivers and UICs for PRECISION GRIPPER.

Attachment manager 110 can also manage connected software components in the same manner as robotic peripherals, where the user specifies that a software component has been added to platform 100 (e.g., via download or update or patch) and attachment manager 110 inspect attachment manifest 150 for that component to see if any drivers, processes, or UICs need to be loaded. When a software component is added to platform 100, attachment manager 110 can also choose to load the software component automatically without user input.

Figure 4A:
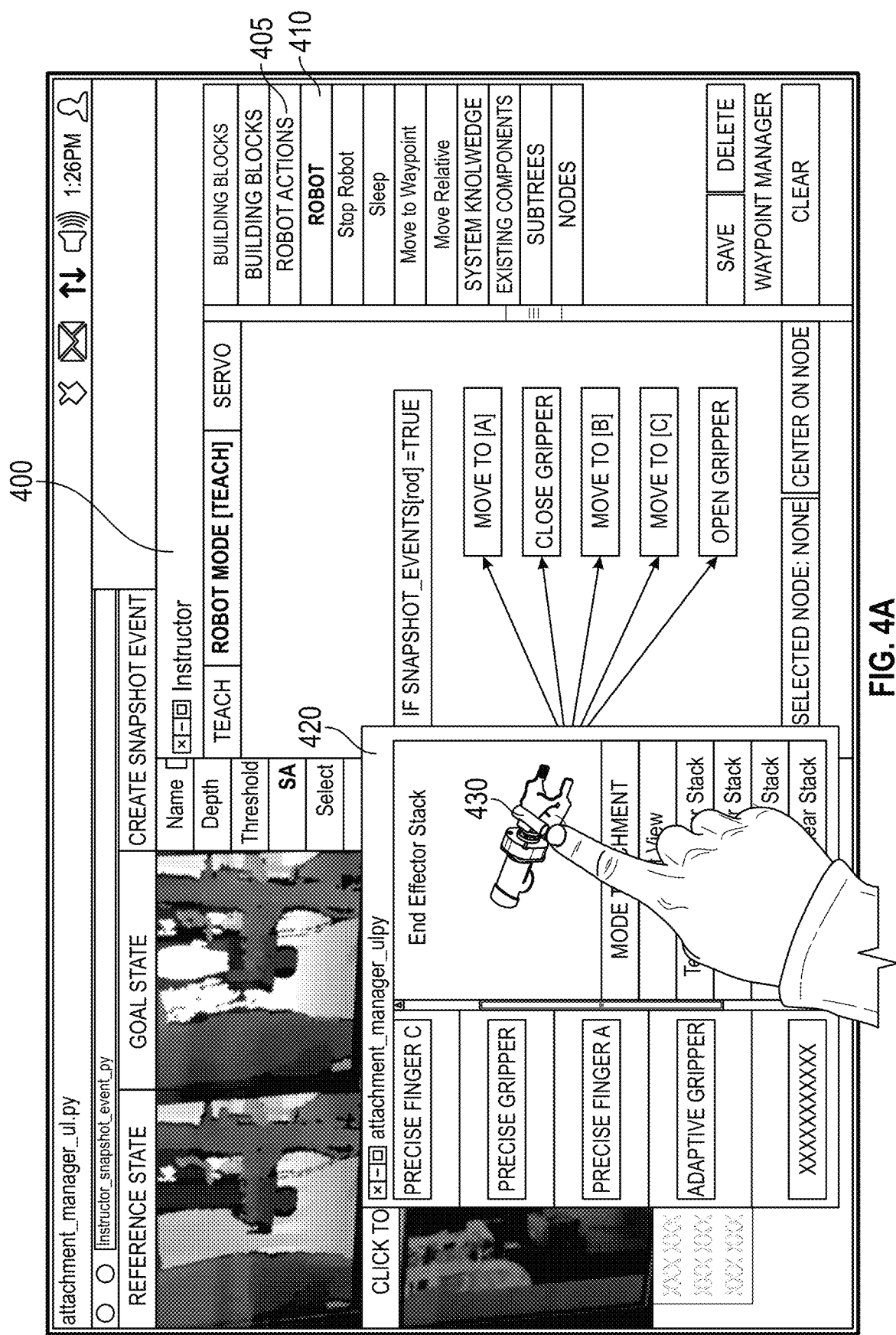
Figure 4B:
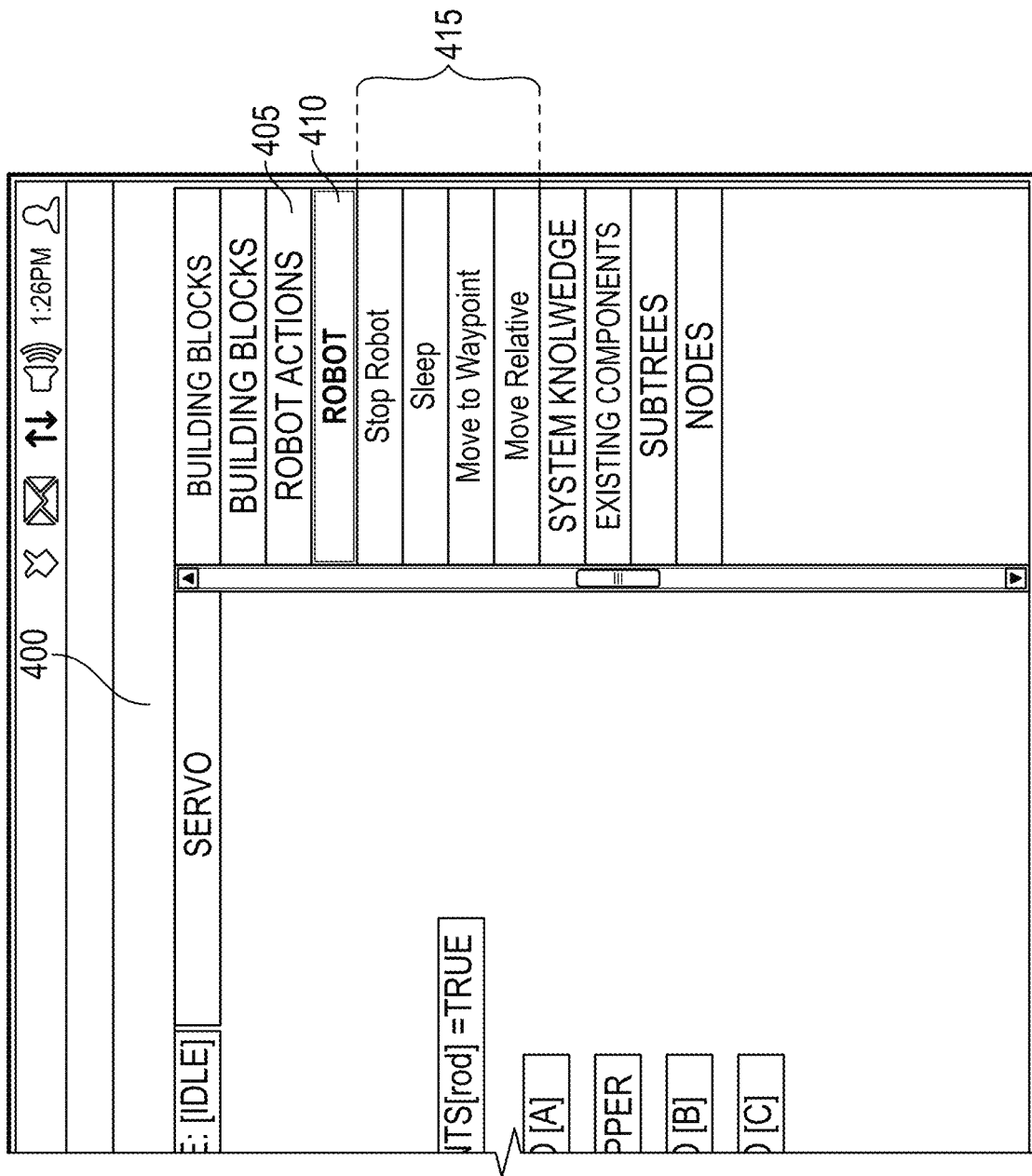
Figure 5:
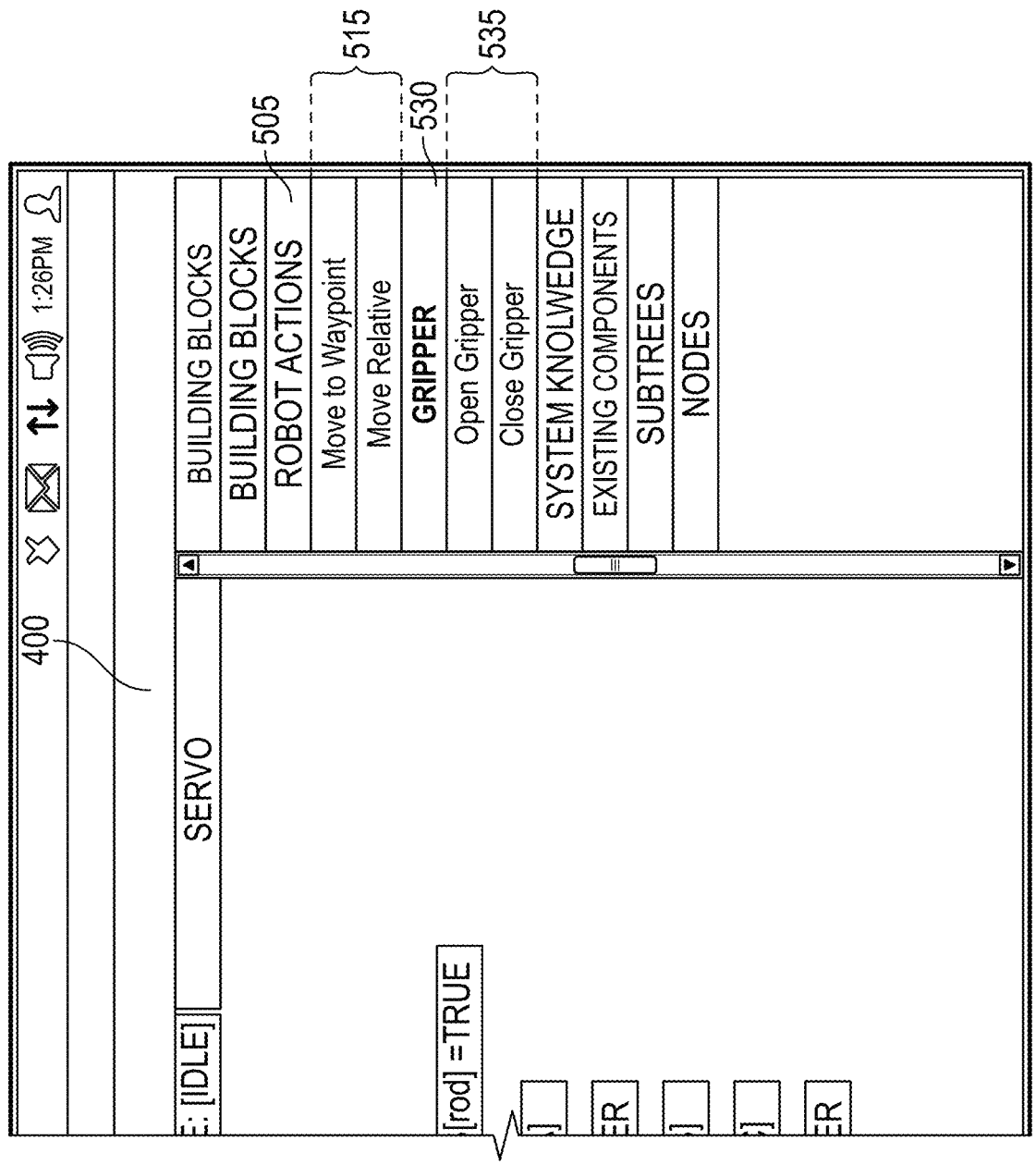

Several other simple examples are shown in FIGS. 4A, 4B, and 5: (a) The user attaches a new gripper to robot 310, and the robot UI is updated with an OPEN and CLOSE buttons for that gripper automatically; (b) The user downloads a new perception software module, and attachment manager 110 automatically loads the user interface for that module; (c) The user removes an active peripheral electric gripper from robot 310, and then attaches a passive, air-driven peripheral. Attachment manager 110 responds by unloading all drivers and UICs for the electric gripper and then load an air valve driver for the air gripper, as well as UICs for the air control. In this manner, a UIC can be used for more than one component; (d) The user inserts a spacer between end effector 315 of robot 310 and an attached gripper. The user drags this spacer to a graphical representation of end effector 315 using attachment MUI 115, and attachment manager 110 updates the mass and collision properties of robot 310 to compensate for the increased mass and length of the end effector loadout; and (e) The user connects a foot pedal actuator via wire to robot 310. The user specifies this connection using attachment MUI 115, and attachment manager 110 loads the driver for the actuator. Attachment manager 110 does not update the mass or collision properties of robot 310 as the pedal actuator is not physically connected to robot 310.

Figure 6:
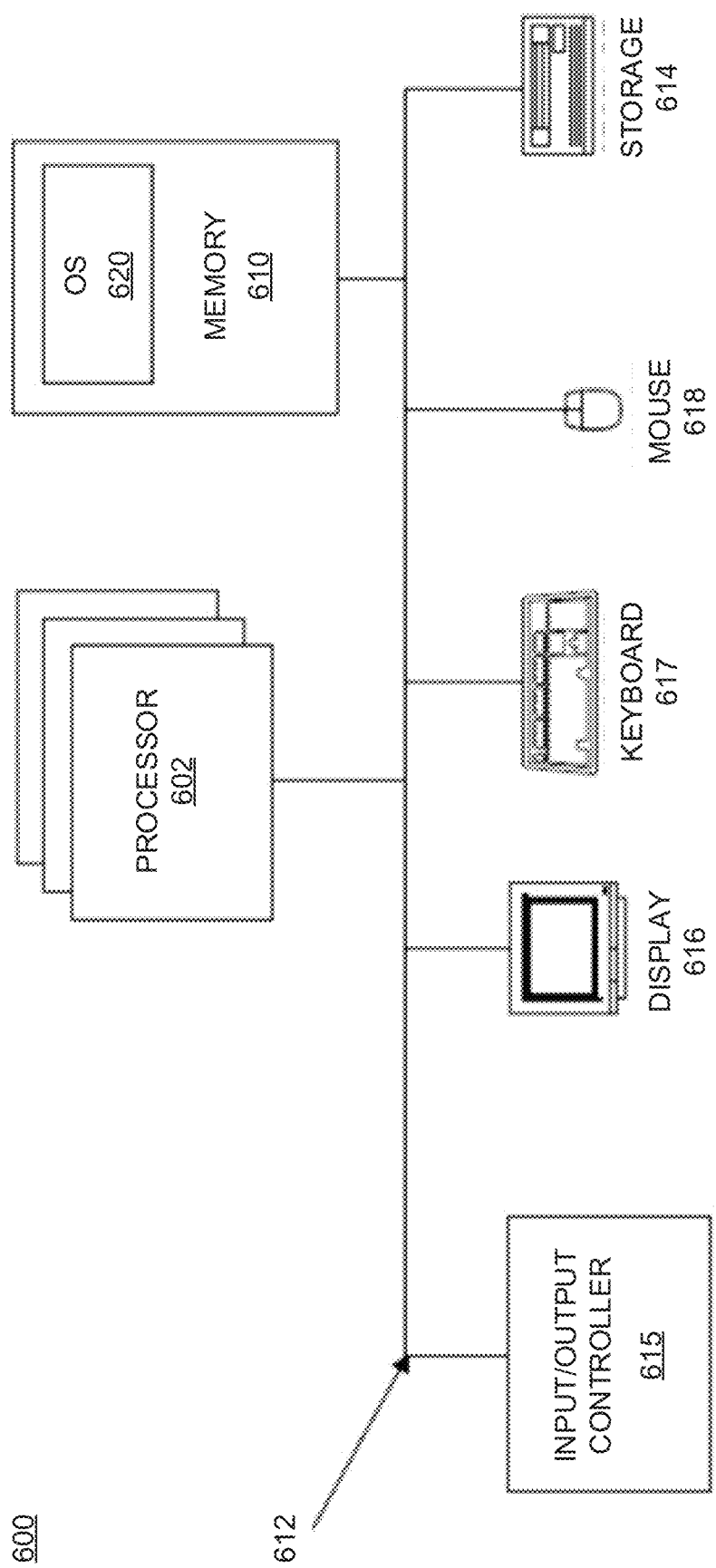
FIG. 6 is an example computer system for performing the disclosed embodiments, consistent with the present disclosure.

FIG. 6 illustrates a computer system 600 that is consistent with embodiments of the present disclosure. In general, embodiments of systems and methods for connection-driven modification of robots' properties and generation of robotic user interfaces may be implemented in or performed by various computer systems, such as one or more personal computers, servers, workstations, embedded systems, multifunction devices, or a combination thereof. Certain embodiments of the systems or modules therein may be embedded as a computer program. The computer program may exist in a variety of forms both active and inactive. For example, the computer program can exist as software program(s) comprised of program instructions in source code, object code, executable code or other formats; firmware program(s); or hardware description language ("HDL") files. Any of the above can be embodied on a computer readable medium, which include storage devices and signals, in compressed or uncompressed form. However, for purposes of explanation, system 600 is shown as a general purpose computer that is well known to those skilled in the art. Examples of the components and peripherals that may be included in system 600 will now be described.

As shown, system 600 may include at least one processor 602, a keyboard 617, a pointing device 618 (e.g., a mouse, a 3-D pointing device, a touchpad, and the like), a display 616, main memory 610, an input/output controller 615, and a storage device 614. Storage device 614 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printer driver can be stored on, for example, storage device 614. System 600 may also be provided with additional input/output devices, such as a printer (not shown). The various components of system 600 communicate through a system bus 612 or similar architecture. In addition, system 600 may include an operating system ("OS") 620 that resides in memory 610 during operation. One skilled in the art will recognize that system 600 may include multiple processors 602. For example, system 600 may include multiple copies of the same processor. Alternatively, system 600 may include a heterogeneous mix of various types of processors. For example, system 600 may use one processor as a primary processor and other processors as co-processors. For another example, system 600 may include one or more multi-core processors and one or more single core processors. Thus, system 600 may include any number of execution cores across a set of processors (e.g., processor 602). As to keyboard 617, pointing device 618, and display 616, these components may be implemented using components that are well known to those skilled in the art. One skilled in the art will also recognize that other components and peripherals may be included in system 600.

Main memory 610 serves as a primary storage area of system 600 and holds data that is actively used by applications, such as the attachment manager in the robotic programming platform, running on processor 602. One skilled in the art will recognize that applications are software programs that each contains a set of computer instructions for instructing system 600 to perform a set of specific tasks during runtime, and that the term "applications" may be used interchangeably with application software, application programs, device drivers, and/or programs in accordance with embodiments of the present teachings. Memory 610 may be implemented as a random access memory or other forms of memory as described below, which are well known to those skilled in the art.

OS 620 is an integrated collection of routines and instructions that are responsible for the direct control and management of hardware in system 600 and system operations. Additionally, OS 620 provides a foundation upon which to run application software and device drivers. For example, OS 620 may perform services, such as resource allocation, scheduling, input/output control, and memory management. OS 620 may be predominantly software, but may also contain partial or complete hardware implementations and firmware. Well known examples of operating systems that are consistent with the principles of the present teachings include ROBOT OPERATING SYSTEM, LINUX, UNIX, ORACLE SOLARIS, MICROSOFT WINDOWS, MAC OS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 602), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

What is claimed is:

1. A computer-implemented method for generation of a robotic user interface, the method comprising:
    determining a connection of a robotic peripheral to a robot, wherein the robotic peripheral is a passive peripheral;
    receiving, via a manager user interface (MUI), a peripheral identifier of the robotic peripheral;
    obtaining a peripheral property set corresponding to the robotic peripheral based on the peripheral identifier, wherein the peripheral property set includes one or more properties of the robotic peripheral;
    generating a robotic graphical user interface (RGUI) dynamically, based on the peripheral property set, in response to the determining the connection of the robotic peripheral to the robot, wherein the RGUI provides at least one user-accessible interface to control at least the robotic peripheral; and
    controlling at least the robotic peripheral in response to user input received via the RGUI.

2. The method of claim 1, further comprising modifying, based on the peripheral property set, a robotic property set that includes one or more properties of the robot to provide a modified robotic property set;
    wherein the one or more properties of the robot include at least one of mass-related information, inertia-related information, dynamics-related information, collision-related information, control gains-related information, simulation-related information, logical state-related information, kinematics-related information, connection site-related information, or one or more images representative of the robot, and
    wherein the controlling at least the robotic peripheral in response to user input received via the RGUI comprises controlling, based on the modified robotic property set, at least the robotic peripheral in response to user input received via the RGUI.

3. The method of claim 2, further comprising:
    identifying at least one connection site of the robot through which the connection of the robotic peripheral to the robot is formed.

4. The method of claim 3, wherein modifying the robotic property set further comprises:
    obtaining one or more properties of the at least one connection site of the robot; and
    modifying the robotic property set based on the one or more properties of the at least one connection site.

5. The method of claim 1, further comprising:
    identifying one or more connection sites of the robot capable of accepting the robotic peripheral based on a peripheral identifier;
    displaying, via a manager user interface (MUI), one or more connection sites of the robot capable of accepting the robotic peripheral; and
    receiving a user indication of the at least one connection site that corresponds to a user selection of the one or more displayed connection sites of the robot.

6. The method of claim 5, further comprising:
    displaying a graphical representation of the robotic peripheral connected to a graphical representation of the robot at the at least one connection site.

7. The method of claim 1, wherein the generating the RGUI further comprises generating, in real-time, the RGUI in response to determining the connection of the robotic peripheral to the robot.

8. The method of claim 7 further comprising:
    adding the robotic peripheral to a loadout of the robot; and
    regenerating a graphical representation of the loadout of the robot to include the robotic peripheral and the connection of the robotic peripheral to the robot.

9. The method of claim 1, further comprising:
    determining that the robotic peripheral is in a list of authorized robotic peripherals.

10. The method of claim 1, wherein the one or more peripheral properties include at least one of a relative mounting offset, a peripheral driver, a connection type, one or more applicable UI elements, and one or more images representative of the robotic peripheral.

11. A system of connection-driven generation of robotic user interfaces and modification of robotic properties, comprising:
    a non-transitory memory storing instructions; and
    a processor executing the instructions to cause the system to perform operations comprising:
        determining a connection of a robotic peripheral to a robot, wherein the robotic peripheral is a passive peripheral;
        receiving, via a manager user interface (MUI), a peripheral identifier of the robotic peripheral;
        obtaining a peripheral property set corresponding to the robotic peripheral based on the peripheral identifier, wherein the peripheral property set includes one or more properties of the robotic peripheral;
        generating a robotic graphical user interface (RGUI) dynamically, based on the peripheral property set, in response to the determining the connection of the robotic peripheral to the robot, wherein the RGUI provides at least one user-accessible interface to control the robot and the robotic peripheral; and
        controlling at least the robotic peripheral in response to user input received via the RGUI.

12. The system of claim 11, wherein the operations further comprise modifying, based on the peripheral property set, a robotic property set that includes one or more properties of the robot to provide a modified robotic property set;

wherein the one or more properties of the robot include at least one of mass-related information, inertia-related information, dynamics-related information, collision-related information, control gains-related information, simulation-related information, logical state-related information, kinematics-related information, connection site-related information, or one or more images representative of the robot, and wherein the controlling at least the robotic peripheral in response to user input received via the RGUI comprises controlling, based on the modified robotic property set, at least the robotic peripheral in response to user input received via the RGUI.

13. The system of claim 12, wherein the operations further comprise:

identifying at least one connection site of the robot through which the connection of the robotic peripheral to the robot is formed.

14. The system of claim 13, wherein the operations further comprise:

obtaining one or more properties of the at least one connection site of the robot; and modifying the robotic property set based on the one or more properties of the at least one connection site.

15. The system of claim 11, wherein the generating the RGUI further comprises generating, in real-time, the RGUI in response to determining the connection of the robotic peripheral to the robot.

16. The system of claim 15, wherein the operations further comprise:

adding the robotic peripheral to a loadout of the robot; and regenerating a graphical representation of the loadout of the robot to include the robotic peripheral and the connection of the robotic peripheral to the robot.

17. A non-transitory computer-readable storage medium containing instructions which, when executed on a processor, perform a method comprising:

determining a connection of a robotic peripheral to a robot, wherein the robotic peripheral is a passive peripheral;

receiving, via a manager user interface (MUI), a peripheral identifier of the robotic peripheral;

obtaining a peripheral property set corresponding to the robotic peripheral based on the peripheral identifier, wherein the peripheral property set includes one or more properties of the robotic peripheral;

generating a robotic graphical user interface (RGUI) dynamically, based on the peripheral property set, in response to the determining the connection of the robotic peripheral to the robot, wherein the RGUI provides at least one user-accessible interface to control at least the robotic peripheral; and controlling at least the robotic peripheral in response to user input received via the RGUI.

* * * * *